No. 799,603. PATENTED SEPT. 12, 1905.
A. W. KING.
FLUID MOTION INDICATOR.
APPLICATION FILED NOV. 1, 1902.
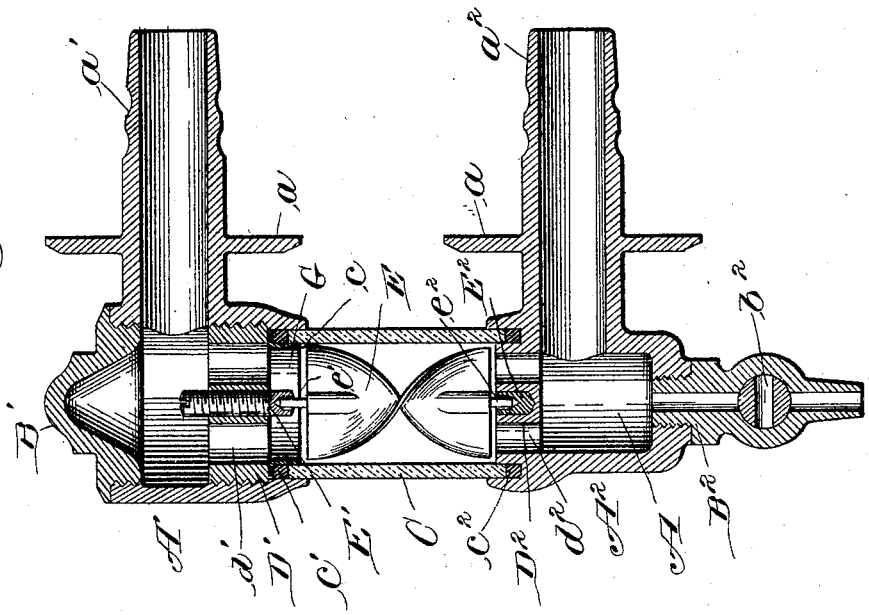
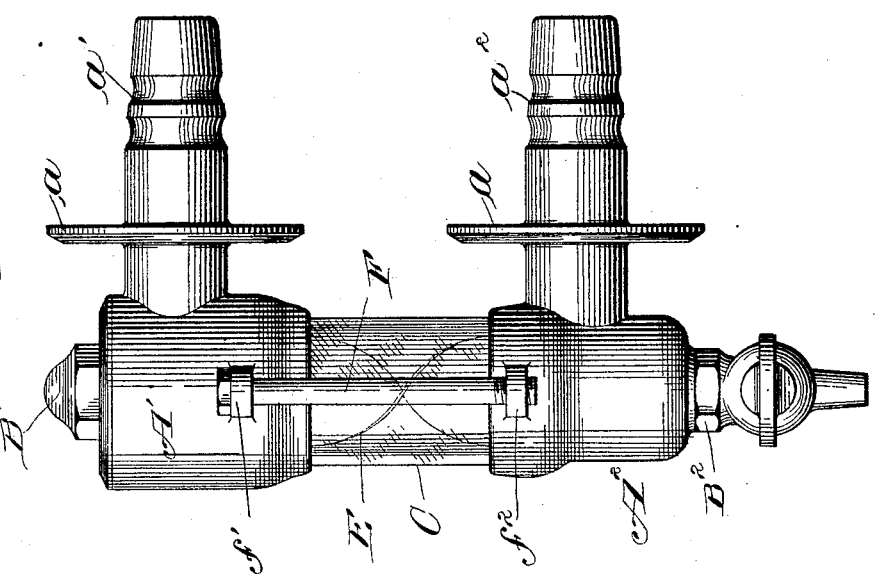
Witnesses:
H. S. Gaither
C. C. Cunningham
Inventor:
Albert W. King
by Chamberlin Wilkinson
Attorneys.

UNITED STATES PATENT OFFICE.

ALBERT W. KING, OF MAYWOOD, NEW JERSEY, ASSIGNOR OF ONE-HALF TO EDWIN F. BROWN, OF CHICAGO, ILLINOIS.

FLUID-MOTION INDICATOR.

No. 799,603.          Specification of Letters Patent.          Patented Sept. 12, 1905.

Application filed November 1, 1902. Serial No. 129,785.

*To all whom it may concern:*

Be it known that I, ALBERT W. KING, a citizen of the United States, residing at Maywood, county of Hudson, State of New Jersey, have invented a certain new and useful Improvement in Fluid-Motion Indicators; and I declare the following to be a full, clear, and exact description of the invention, such as will enable others skilled in the art to which it pertains to make and use the same, reference being had to the accompanying drawings, which form a part of this specification.

My invention relates in general to indicators, and more particularly to devices for indicating the motion of fluids—such, for instance, as the circulation of fluid in the cooling systems of gas-engines.

It is well known to those familiar with gas-engines, and especially to the users of automobiles propelled by gas-engines, that the water-circulating system for effecting the cooling of the cylinders requires frequent attention in order to determine whether the means for causing the water to circulate are in proper working condition.

The primary object of my invention is to provide a visual indicator for fluid-circulating systems by means of which it may be readily ascertained at a glance whether the water is properly circulating through the water jacket, storage, and cooling receptacles, thereby avoiding the expenditure of time and labor on the part of the operator incident to an examination of the means employed for causing the water to circulate—such means, for instance, as a pump, pulsometer, or the main location of the water-jackets and water-storage receptacle at different levels.

A further object of my invention is to provide an indicating device for disclosing the state of purity of the fluid and for collecting the impurities as the fluid passes through the indicator.

A still further object of my invention is to provide an indicator of the character referred to which will be simple in construction, inexpensive in manufacture, and efficient in operation.

The embodiment of my invention herein disclosed, generally described, consists in an indicating device located at a convenient point in the circulating system and comprising a transparent casing through which the fluid passes, hollow supports between which said casing is mounted, the casing being removable through one of said heads, and a vane pivotally mounted within said casing, whereby the flow of the fluid rotates the vane, the movement of which may be observed through the transparent casing.

My invention will be more fully described hereinafter with reference to the accompanying drawings, in which the same is illustrated in a convenient and practical form, and in which—

Figure 1 is an elevational view of an embodiment of my invention detached from the circulating system, and Fig. 2 a vertical sectional view of the embodiment of the invention shown in Fig. 1.

Similar reference characters are used to designate similar parts in both figures of the drawings.

The indicator is interposed in the circulating system at any point where it may be conveniently observed by the operator of the machine to which it is attached. Reference characters $a'$ and $a^2$ indicate tubular couplings which may be connected with the circulating system by any suitable means—such, for instance, as rubber tubing, into which the couplings $a'$ and $a^2$ may be inserted. The couplings $a'$ and $a^2$ may conveniently be formed integrally with upper and lower heads $A'$ and $A^2$. The heads $A'$ and $A^2$ are provided with chambers which communicate the openings extending through the couplings $a'$ and $a^2$.

The chambers in the upper and lower heads are placed in communication with each other by means of a casing C, a portion of which at least is transparent. The casing C is preferably formed from annealed glass of suitable thickness. The lower end of the casing C is received in an annular groove formed in the upper end of the lower head $A^2$, a packing $c^2$ being interposed between the casing and the groove in the head $A^2$. The upper end of the casing C enters an opening in the lower surface of the upper head $A'$. A packing $c'$ is inserted between the upper end of the casing C and a center-bearing $D'$, removably secured within the chamber in the upper head $A'$ at a point below its communication with the opening in the coupling $a'$. A washer G may, if desired, be inserted between the packing $c'$ and the lower surface of the center-bearing $D'$.

The center-bearing D' is provided with vertical openings $d'$ through the same, while a lower center-bearing $D^2$, preferably formed integrally with the lower head $A^2$, is also provided with perforations $d^2$. The upper removable center-bearing D' may be inserted and removed from the chamber in the upper head A' through the opening at the top of the upper head A', which may be normally closed by any suitable means—such, for instance, as the screw-threaded cap B'.

Located within the casing C is a vane E, which may conveniently be constructed in the form of a spiral plate. Pintles $e'$ and $e^2$ project above and below the vane E' in the line of its axis and serve as supports about which the vane revolves. The lower pintle $e^2$ is journaled in a bearing $E^2$, located in a recess formed in the lower center-bearing $D^2$. The upper pintle $e'$ is journaled in a vertically-adjustable bearing E', which may conveniently be constructed in the form of a screw which engages a screw-threaded opening through the upper center-bearing D'.

The chamber in the lower head $A^2$ extends below the point at which the coupling $a^2$ communicates therewith, so as to form a cavity A. A nozzle $B^2$ depends from the lower head $A^2$ and communicates with the cavity A. A two-way cock $b^3$ controls the passage in the nozzle $B^2$.

The upper and lower heads are united so as to retain the casing C in the proper position between the chambers in the heads. Any suitable means may be employed for this purpose—such, for instance, as a bolt F, which extends through an eye $f'$ on the upper member and which is in screw-threaded engagement with an eye $f^2$, projecting from the lower head.

Any suitable means may be provided for securing the indicator in the desired position upon the machine in connection with which it is to be used. Circular flanges $a$, surrounding the couplings $a'$ and $a^2$, are shown for such purpose.

The parts of the indicator may be readily assembled by means of the removable tie-bolts F, one of which may be located on either side of the casing and which are, as indicated in Fig. 1 of the drawings, not of sufficient size to obscure the vision through the vitreous transparent casing C. Access may be had to the interior of the head A' by removing the cap B', thereby permitting the adjustment of the bearing E' so as to permit the vane E to freely rotate about its pintles. The recesses in the bearings E' and $E^2$, within which the pintles are seated, are preferably inclined, as indicated in Fig. 2, so as to reduce the friction between the pintles and their supporting-bearings to a minimum.

Should the casing C become broken, a new one may be readily inserted by removing the cap B', the center-bearing D', and the packing $c'$. A new casing, similar to C, may then be introduced through the large opening left by the removal of the parts enumerated—i. e., B' D' $c'$—without disturbing the working alinement of the two heads A' and $A^2$.

The indicator may be inserted in the fluid-circulating system at any suitable point thereof by cutting the system at the point desired and connecting the respective ends of the tubular circulating system, by means of rubber hose or other hollow members, to the respective couplings $a'$ and $a^2$, provided for that purpose on the upper and lower heads of the indicator.

The operation of my invention, which will be readily understood from the foregoing description, is as follows: The fluid enters through one of the couplings, and after passing through the adjacent head, the casing, the other head passes thence through the other coupling back to the circulating system. It is obvious that it is immaterial, as far as the indicator is concerned, in which direction the fluid flows through the indicator. The passage of the fluid through the casing C revolves the vane E through the contact of the fluid with the spirally-inclined surfaces of the vane. The movement of the vane is readily observed through the transparent casing C, so that a glance at the indicator is sufficient to determine whether the fluid is properly circulating. The condition of the fluid as to purity may also be observed from an inspection of the indicator. In order that the motion of the vane may be more noticeable, the opposite surfaces thereof may be differently colored. During the passage of the fluid through the indicator foreign matter collects in the pocket A, from which it may be drawn through the nozzle $B^2$ by opening the cock $b^2$, thereby freeing the fluid from such impurities as are of a specific gravity to be deposited in the pocket A. The position of the pocket below the communication of the hollow coupling $a^2$ with the chamber in the lower head $A^2$ permits the impurities to flow below the path of circulation of the fluid.

From the foregoing description it will be observed that I have invented an indicator for rendering the condition of circulating fluid both as to speed of circulation and as to purity discernible at a glance, thereby avoiding the necessity of taking the elements of the circulating system apart in order to determine whether the circulating system is in proper working condition. It is also obvious that by the use of my invention the circulating fluid may be freed from much foreign matter, owing to the pocket and the cock leading therefrom.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In a device for indicating the circulation of fluid, the combination with a casing, of a vane located within and visible through said casing, hollow supports for the opposite ends of said casing in communication with the circulating system, and means for freeing the fluid from foreign matter which collects in the lower of said hollow supports during its passage through the indicator.

2. In a device for indicating the circulation of fluid, the combination with a casing, of a vane located within and visible through said casing, hollow supports for the opposite ends of said casing in communication with the circulating system, one of said hollow supports having a cavity to receive deposits of foreign matter from the fluid, and means for permitting the flow of such foreign matter out of the indicator.

In testimony whereof I sign this specification in the presence of two witnesses.

ALBERT W. KING.

Witnesses:
GEORGE R. BEACH,
FLORENCE SMALL.